Figure 4:
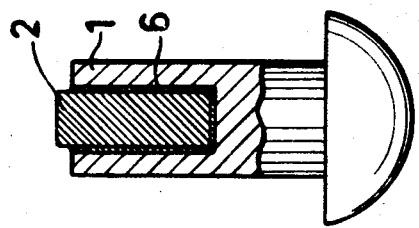
Figure 3:
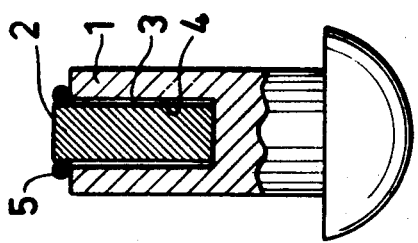

United States Patent

[11] 3,600,795

| [72] | Inventor | John Olof Brundin |
| | | Fagersta, Sweden |
| [21] | Appl. No. | 778,387 |
| [22] | Filed | Nov. 25, 1968 |
| [45] | Patented | Aug. 24, 1971 |
| [73] | Assignee | Fagersta Bruks Aktiebolag |
| | | Fagersta, Sweden |
| [32] | Priority | Nov. 27, 1967 |
| [33] | | Sweden |
| [31] | | 16232/67 |

[54] METHOD OF SOLDERING
4 Claims, 4 Drawing Figs.

[52] U.S. Cl. ........................................... 29/473.1,
29/482, 29/493
[51] Int. Cl. ........................................... B23k 31/02
[50] Field of Search ........................................... 29/473.1,
472.9, 474.4, 474.6, 493, 497.5, 500, 95.3, 489,
503, 472.3, 482

[56] References Cited
UNITED STATES PATENTS
1,341,436  5/1920  Otterson ..................... 29/95 UX

| 2,084,441 | 6/1937 | Howard et al. ................ | 29/470.5 |
| 2,130,684 | 9/1938 | Hintermeyer ................ | 29/95 UX |
| 2,334,755 | 11/1943 | Eglinton ....................... | 29/500 X |
| 2,483,220 | 9/1949 | Morrow ........................ | 29/95 UX |
| 2,987,815 | 6/1961 | Zeller ........................... | 29/500 X |
| 3,180,023 | 4/1965 | Titus ............................. | 29/472.9 X |
| 3,372,464 | 3/1968 | Vincent et al. ................ | 29/473.1 |

OTHER REFERENCES
Metals Handbook, 8 th Edition, Vol. 1, Properties and Selection of Metals, Copyright 1961, pp. 720–724.

*Primary Examiner*—John F. Campbell
*Assistant Examiner*—Ronald J. Shore
*Attorney*—Darby & Darby ABSTRACT: A method of soldering together two metal bodies having substantially different coefficients of expansion wherein a first body having a low coefficient of expansion is snugly fitted into a recess in a second body having a high coefficient of expansion, and effecting a soldering gap between said first and second bodies by heating them to the soldering temperature thereby causing a differential expansion of the bodies due to their different coefficients of expansion.

METHOD OF SOLDERING

This invention relates to a method of joining together by soldering in a novel and effective way two bodies, which have substantially different expansion coefficients.

The invention particularly relates to soldering a body of cemented carbide on a body of steel and, thus, is based hereby on the great difference in heat expansion for steel and cemented carbide, respectively (the expansion coefficient being approx. $11 \times 10^{16}$ and $5 \times 10^{16}$, respectively).

The invention is substantially characterized in that the cemented carbide body is inserted into the steel body without play therebetween, and that the gap required between said bodies for the formation of the soldered joint is effected during the heating to the soldering temperature by the different expansions of the bodies owing to the different expansion coefficients.

When, for example, a cemented carbide body so is being pressed or shrunk into a steel body that there will be no play but an interference, and thereafter heating is carried out to the temperature applied at brazing (800–1200° C.), a gap will be formed, owing to the greater expansion of the steel, between the cemented carbide and the steel body. The soldering metal when it is brought into contact with the gap, penetrates into the gap because of the capillary forces. During the cooling following the soldering, the cemented carbide is subjected to compressive stresses and the steel body is subjected to tensile stresses. At the method according to the invention the soldered joint is thinner than at conventional soldering and, in spite of great manufacturing tolerances, a highly constant joint thickness is obtained. The main object of the invention, however, is to obtain a particularly economical method for safely securing the cemented carbide body in the steel body.

Hole cutting work in steel and grinding of cemented carbide tips (the latter being applied when constant joint thicknesses are required) are expensive operations, which can be abolished with the method of this invention. The principle of the invention, however, can also be applied to the shrinking of cemented carbide into a hole made in advance, the soldering being carried out subsequent to the heating and adding of solder to the contact surfaces of the shrinking method. This implies the advantage that constant thin soldered joints can be obtained, in spite of relatively wide working tolerances in the hole and without grinding or other working of the cemented carbide, which is applied directly in its sintered state.

The invention will be described in greater detail in the following by way of three examples whereof the first example is illustrated in the accompanying drawing.

The first example, which thus is shown in FIGS. 1–4 of the drawing, illustrates the steps in the manufacture of a tyre spike. It is to be observed, however, that for reasons of better clarity the gap shown in FIG. 3 and the soldered joint shown in FIG. 4 have been given overdimensioned thicknesses.

Figure 2:
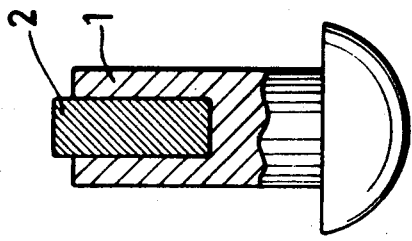
Figure 1:
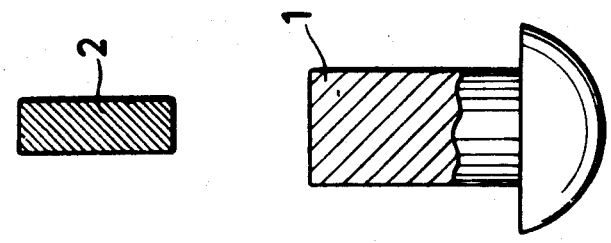

FIG. 1 shows a solid steel body 1 and a cemented carbide pin 2. The cemented carbide pin is inserted into the steel body by cold pressing (FIG. 2). Subsequent to heating to soldering temperature a gap 3 is formed between the cemented carbide pin and the hole 4 in the steel body. The solder 5 is added, and subsequent to cooling the spike has the appearance shown in FIG. 4 with a very thin soldered joint 6.

The second example relates to the pressing of cemented carbide staves with protection against oxidation into a heated steel body, which at the operation is enclosed in a die. Cooling is to be carried out after the stave is pressed in whereafter solder is applied and heating to soldering temperature is effected. A gap is formed between steel and cemented carbide, and the solder penetrates in the aforedescribed way.

In the third example, holes or recesses are made in advance in a steel body and given dimensions smaller than those of the cemented carbide body, and cemented carbide is shrunk into said holes. Solder is applied and the detail is heated to soldering temperature, the result being as described above.

The invention, of course, comprises a plurality of other examples. In the first and second of the above described examples, for instance, the cemented carbide body has preferably cylindric shape, which also in many cases is to be preferred from a stress point of view. The cemented carbide body, however, may also have another shape, as for example rectangular, square, pentagonal, hexagonal a.s.o.

The invention, furthermore, may also comprise an embodiment where the cemented carbide body only partially is enclosed by the steel body, which possibly is most applicable at the third example described above. Also other variations are possible within the scope of the invention, such as for example that the invention can relate to soldering together two bodies consisting of materials other than cemented carbide and steel.

I claim:

1. A method of soldering together two bodies having substantially different coefficients of expansion and selected from the group of materials consisting of metals and cemented carbide comprising the steps of inserting a first body having a relatively low coefficient of expansion into force-fitting engagement with a second body having a relatively high coefficient of expansion, heating said first and second bodies to a temperature sufficient to form a gap between said first and second bodies and to melt a soldering composition, and applying said soldering composition to at least one of said heated bodies in the area of said gap to melt said soldering composition and said melted soldering composition being drawn into said gap by capillary action.

2. A method according to claim 1 wherein said first body is cemented carbide and said second body is steel.

3. A method according to claim 1 including the step of heating said bodies to a temperature between 800° C. and 1200° C.

4. A method according to claim 1, including the step of hot-pressing said cemented carbide body into said steel body.